United States Patent
Lynch et al.

(10) Patent No.: US 9,581,681 B2
(45) Date of Patent: Feb. 28, 2017

(54) METHOD AND APPARATUS FOR PROCESSING CODED APERTURE RADAR (CAR) SIGNALS

(71) Applicant: HRL Laboratories, LLC, Mailbu, CA (US)

(72) Inventors: Jonathan J. Lynch, Oxnard, CA (US); Zhiwei A. Xu, Irvine, CA (US); Yen-Cheng Kuan, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 134 days.

(21) Appl. No.: 14/561,111

(22) Filed: Dec. 4, 2014

(65) Prior Publication Data

US 2015/0160335 A1    Jun. 11, 2015

Related U.S. Application Data

(60) Provisional application No. 61/912,990, filed on Dec. 6, 2013.

(51) Int. Cl.
*G01S 13/72* (2006.01)
*G01S 7/28* (2006.01)
(Continued)

(52) U.S. Cl.
CPC .............. *G01S 7/2813* (2013.01); *G01S 7/02* (2013.01); *G01S 13/02* (2013.01); *G01S 13/343* (2013.01);
(Continued)

(58) Field of Classification Search
CPC ............. G01S 7/2813; G01S 7/02; G01S 13/02
(Continued)

(56) References Cited

U.S. PATENT DOCUMENTS 3,852,753 A    12/1974  Blakemore
4,649,393 A *   3/1987  Rittenbach ............... H01Q 3/38
                                                      333/139

(Continued)

OTHER PUBLICATIONS

EPO Extended Search Opinion from European Patent Application No. 12872244.4 dated Sep. 25, 2015 with EPO transmittal letter of Sep. 28, 2015.
(Continued)

*Primary Examiner* — Marcus Windrich
(74) *Attorney, Agent, or Firm* — Ladas & Parry

(57) ABSTRACT

A radar system in which Coded Aperture Radar processing is performed on received radar signals reflected by one or more objects in a field of view which reflect a transmitted signal which covers a field of view with K sweeps and each sweep including Q frequency changes. For Type II CAR, the transmitted signal also includes N modulated codes per frequency step. The received radar signals are modulated by a plurality of binary modulators the results of which are applied to a mixer. The output of the mixer, for one acquisition results in a set of Q·K (for Type I CAR) or Q·K·N (for Type II CAR) complex data samples, is distributed among a number of digital channels, each corresponding to a desired beam direction. For each channel, the complex digital samples are multiplied, sample by sample, by a complex signal mask that is different for each channel.

40 Claims, 6 Drawing Sheets

A block diagram of CAR Type I digital processing. The digitized mixer signal is split into parallel processing channels, one for each beam position. After applying a signal mask, the masked signal in each channel is organized into a matrix and a 2D FFT is applied for range/velocity estimates. The result is a range/velocity matrix for each beam position.

(51) Int. Cl.

| | | |
|---|---|---|
| *G01S 7/02* | (2006.01) | |
| *G01S 13/02* | (2006.01) | |
| *G01S 13/34* | (2006.01) | |
| *G01S 13/44* | (2006.01) | |
| *G01S 13/536* | (2006.01) | |
| G01S 7/35 | (2006.01) | |
| G01S 13/88 | (2006.01) | |
| G01S 13/93 | (2006.01) | |
| G01S 13/94 | (2006.01) | |

(52) U.S. Cl.
CPC ...... *G01S 13/4418* (2013.01); *G01S 13/4463* (2013.01); *G01S 13/536* (2013.01); G01S 13/882 (2013.01); G01S 13/931 (2013.01); G01S 13/94 (2013.01); G01S 2007/356 (2013.01)

(58) Field of Classification Search
USPC .......................................... 342/109, 194, 196
See application file for complete search history.

(56) References Cited

U.S. PATENT DOCUMENTS

| | | | |
|---|---|---|---|
| 5,940,029 | A | 8/1999 | Ninomiya |
| 5,945,947 | A | 8/1999 | Cunningham |
| 5,955,985 | A | 9/1999 | Kemkemian |
| 6,266,010 | B1 | 7/2001 | Ammar |
| 6,384,784 | B1* | 5/2002 | Gumm .................. G01S 5/0081 342/387 |
| 6,914,559 | B2 | 7/2005 | Marks |
| 7,151,478 | B1 | 12/2006 | Adams |
| 7,224,314 | B2 | 5/2007 | Lee |
| 7,277,046 | B2 | 10/2007 | Adams et al. |
| 2003/0025629 | A1 | 2/2003 | Barrick |
| 2003/0210185 | A1 | 11/2003 | Hager et al. |
| 2004/0252047 | A1 | 12/2004 | Miyake et al. |
| 2005/0275585 | A1 | 12/2005 | Shima |
| 2006/0119513 | A1* | 6/2006 | Lee ......................... H01Q 3/38 342/374 |
| 2007/0046540 | A1* | 3/2007 | Taenzer ................ G01S 7/2813 342/442 |
| 2007/0052580 | A1 | 3/2007 | Fiore |
| 2007/0239002 | A1 | 10/2007 | Alam |
| 2008/0129595 | A1 | 6/2008 | Choi |
| 2009/0079617 | A1 | 3/2009 | Shirakawa |
| 2009/0103593 | A1* | 4/2009 | Bergamo ................ H04B 1/707 375/146 |
| 2009/0239551 | A1 | 9/2009 | Woodsum |
| 2009/0251361 | A1 | 10/2009 | Beasley |
| 2009/0310649 | A1 | 12/2009 | Fisher et al. |
| 2012/0092211 | A1 | 4/2012 | Hampel et al. |
| 2013/0169471 | A1 | 7/2013 | Lynch |
| 2013/0169485 | A1 | 7/2013 | Lynch |
| 2014/0111367 | A1* | 4/2014 | Kishigami ............ G01S 7/2813 342/21 |
| 2015/0160331 | A1 | 6/2015 | Lynch |

OTHER PUBLICATIONS

Office action from related Chinese Patent Application No. 201280064222.9 dated Oct. 23, 2015 with brief English summary.
From U.S. Appl. No. 13/725,621 (Now Published as 2013/0169485), Non-Final Rejection mailed on Nov. 30, 2015.
Chapter II, International Preliminary Report on Patentability (IPRP) from PCT/US2014/068669, dated on May 9, 2016.
From U.S. Appl. No. 13/725,621 (now published as US 2013-0169485), Office Action mailed on Jun. 14, 2016.
Office action from related Chinese Patent Application No. 201280064222.9 dated Jul. 25, 2016 and its English translation.
From U.S. Appl. No. 13/725,621 (now published as US 2013-0169485 A1), Office Action mailed on Aug. 20, 2015.
EPO Supplementary European Search Report from European Patent Application No. 12872244.4 dated Aug. 21, 2015.
EPO Office Action from European Patent Application No. 12872244.4 dated Sep. 3, 2015.
PCT International Search Report and Written Opinion from PCT/US2014/068669 dated Aug. 28, 2015.
Dr. Macros A. Bergamo, "Spread Spectrum Digital Beamforming (SSDBF) Radar," IEEE. pp. 665-672, (2010).
M.I. Skolnik, "Introduction to Radar Systems (third edition)," McGraw-Hill, NY, Section 5.2, pp. 276-284 and pp. 305-309, (2001).
D. Adamy, "EW 103: Tactical Battlefield Communication Electronic Warfare," published by Artech House with relevance to "EW 101: A First Course in Electronic Warefare," pp. 209, 211-212 and 214, (2008).
R.O. Schmidt, "Multiple Emitter Location and Parameter Estimation," IEEE Trans. Antennas Propagation, vol. AP-34, No. 3, (Mar. 1986).
S. Drabowich and C. Aubrya, "Pattern Compression by Space-Time Binary Coding of an Array Antenna," Advance Radar Systems, AGARD Conference Proceedings, No. 66, 14/1-14/9, (1970).
From U.S. Appl. No. 14/561,142, (now U.S. Publication No. 2015-0160331 A1) filed on Dec. 4, 2014, Applications and Office Actions.
From U.S. Appl. No. 13/725,621 (now U.S. Publication No. US 2013-0169485 A1), Final Office Action mailed on Apr. 21, 2015.
International Search Report and Written Opinion from PCT/US2012/071501 mailed Sep. 27, 2013.
PCT International Preliminary Report on Patentability (Chapter II) mailed on Feb. 27, 2014 for related PCT/US2012/071501.
International Search Report and Written Opinion from PCT/US2014/068668 mailed Mar. 5, 2015.
From U.S. Appl. No. 13/490,607 (now U.S. Publication No. US 2013-0169471 A1), Non-Final Office Action mailed on Nov. 18, 2014.
From U.S. Appl. No. 13/725,621 (now U.S. Publication No. US 2013-0169485 A1), Final Office Action mailed on Nov. 18, 2014.
From U.S. Appl. No. 14/561,142 (now published as US 2015-0160331), Notice of Allowance mailed on Sep. 20, 2016.

* cited by examiner

Fig. 3 - A block diagram of CAR Type I digital processing. The digitized mixer signal is split into parallel processing channels, one for each beam position. After applying a signal mask, the masked signal in each channel is organized into a matrix and a 2D FFT is applied for range/velocity estimates. The result is a range/velocity matrix for each beam position.

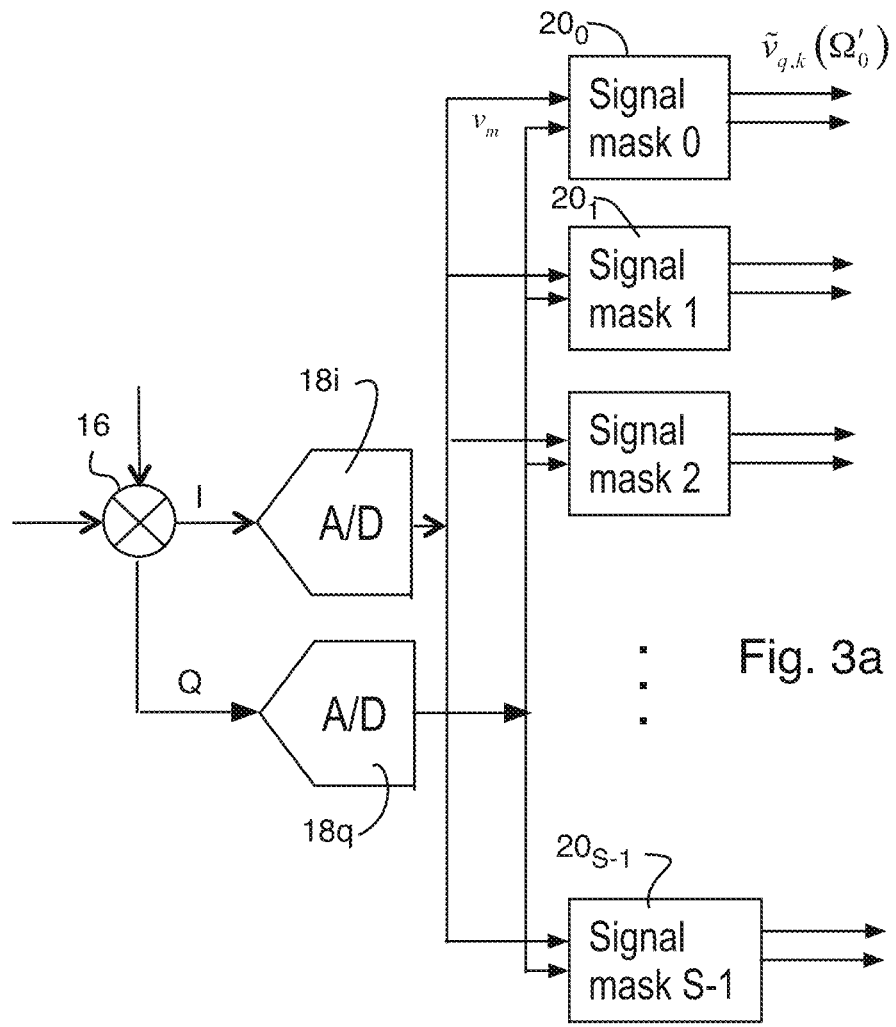
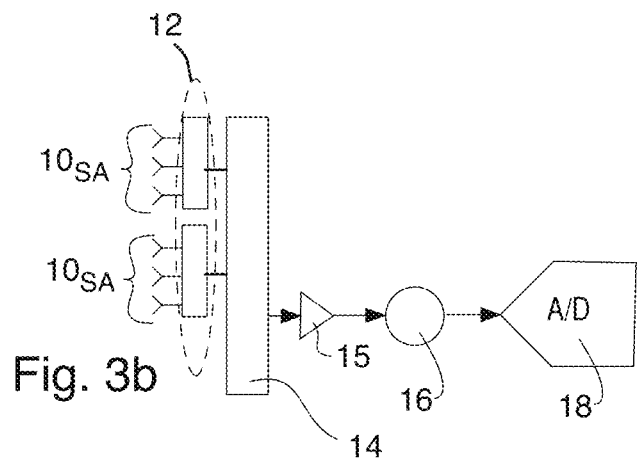

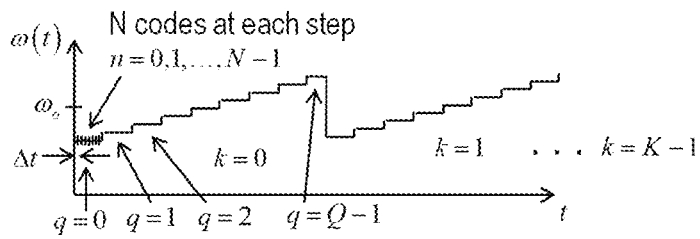

Figure 4—instantaneous transmitted frequency consists of a series of equal steps that are repeated. N codes per step, Q steps per sweep, K sweeps per acquisition.

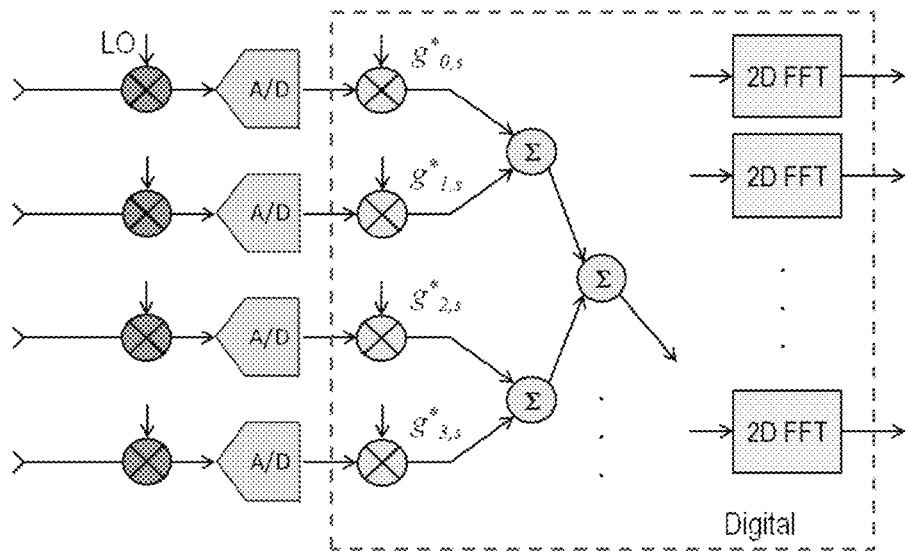

Fig. 6
prior art

Figure 6—block diagram of DBF digital processing. Each antenna element has a separate receiver and A/D converter (ADC). Each ADC sample is multiplied by a signal mask and summed, once for each beam position. The masked signals are then processed to form range/velocity estimates for each beam.

METHOD AND APPARATUS FOR PROCESSING CODED APERTURE RADAR (CAR) SIGNALS

CROSS REFERENCE TO RELATED APPLICATIONS

This application claims priority to and the benefit of U.S. Provisional Patent Application Ser. No. 61/912,990, filed Dec. 6, 2013 and entitled "A Method and Apparatus for Processing Coded Aperture Radar Signals". The disclosure of that U.S. Provisional Patent Application Ser. No. 61/912,990, is hereby incorporated herein by this reference.

This application is related to U.S. patent application Ser. No. 13/490,607 filed Jun. 7, 2012 and entitled "Coded Aperture Beam Analysis Method and Apparatus", the disclosure of which is hereby incorporated herein by reference.

This application is also related to U.S. patent application Ser. No. 13/725,621, filed Dec. 21, 2012 and entitled "Coded Aperture Beam Analysis Method and Apparatus", the disclosure of which is hereby incorporated herein by reference.

This application is also related to U.S. patent application Ser. No. 14/561,142 filed on the same date as this application, Dec. 4, 2014 and entitled "Method and Apparatus for Reducing Noise in a Coded Aperture Radar", the disclosure of which is hereby incorporated herein by reference.

STATEMENT REGARDING FEDERALLY SPONSORED RESEARCH OR DEVELOPMENT

None

TECHNICAL FIELD

This invention relates a method and apparatus for processing a Coded Aperture Radar (CAR) mixer output signal to estimate the range, velocity, and bearing angles of scattering objects in a short period of time and with relatively simple digital circuits. The CAR signal may be processed efficiently by multiplying the signal samples by "signal masks," each of which corresponding to a particular beam direction and stored in memory, and then processing the resulting data using traditional methods (e.g., FFTs) to produce the range/velocity information for each beam position.

BACKGROUND

CAR is a new technology that has not yet been implemented in IC form, therefore is no known prior art for processing methods and hardware for CAR signals.

The most straightforward method for CAR signal processing is to utilize a matched filter technique, which is common in radar signal processing. This technique consists of correlating the received signal against a library of reference signals, each of which corresponding to a scattering object at a particular range, velocity, and bearing angles. When the received signal contains a component due to a scattering object at the reference location, a strong output is produced, with the strength indicating the scattering cross section at the reference location. This technique is effective, but requires an often prohibitive amount of memory to store the reference signals, and significant computation to perform the correlations in a CPU (for example).

Comparing this invention to traditional digital beamforming radar, this invention reduces the computation time and/or the digital hardware complexity significantly, with an even bigger advantage for large arrays. Digital beamforming arrays possess a separate receiver and analog to digital converter (ADC) behind each of the array elements. The large number of output signals are then digitized and the directional beams with desired characteristics are produced by forming linear combinations of the element signals. This technique requires that digital information from all of the elements across the array be weighted and combined, with a separate linear combination for each beam position. This is highly computationally intensive and introduces significant latency for large arrays due to the limited speed with which basic digital calculations (e.g., multiplications) may be made.

One may try to reduce computation time by implementing the weighting and combining in digital hardware, thereby performing the computations in parallel. However, the fact that digital beamforming combines signals from all the elements creates highly complex combining networks that quickly become unfeasible as the array gets large and even more particularly so if the array is a two dimensional (2D) array.

Because the range, velocity, and spatial information for CAR are interdependent, it is not apparent that one may apply a simple set of multiplications and then utilize FFTs to produce estimates of range, velocity, and bearing angles.

SUMMARY OF THE INVENTION

In one aspect the present invention provides a method of processing radar signals reflected from one or more objects in a field of view of a radar transmitter transmitting the radar signals. The method includes receiving and modulating the radar signals reflected from the one or more objects by plurality of binary phase shifters to produce a set of modulated signals, the binary phase shifters being controlled by binary coding data; summing the modulated signals and down converting them, preferably to base band, by a mixer producing in-phase and quadrature output signals which are each sampled and digitized by one or more A/D convertors to produce a set of real and imaginary digital values corresponding to the in-phase and quadrature output signals produced by the mixer during an acquisition of the field of view; distributing real and imaginary digital values corresponding to the in-phase and quadrature output signals produced by the mixer into a number of channels, the number of channels being equal to a number of desired radar beam directions to be processed concurrently and each channel having real and imaginary digital values corresponding to the digitized in-phase and quadrature signals output by the mixer; performing a complex multiplication using the real and imaginary digital values in each channel as one multiplicand and using real and imaginary values of a signal mask as the other multiplicand, the signal mask being different for each channel and for each channel being selected to produce a desired beam with desired characteristics for each channel, each complex multiplication producing a multiplication result which has both real and imaginary parts, the multiplication results or a summation of the multiplication results corresponding the acquisition of the field of view being at least conceptually organizable into a two dimensional set or matrix with each column of the set or matrix corresponding to frequency steps of the transmitted radar signal and each row of the matrix corresponding to a different sweep of the transmitted radar signal; and transforming the real and imaginary parts of said multiplication results or of a summation of said multiplication results in said set or matrix using a transformational function which produces transformed data, conceptually as a set or matrix, wherein each position of the set or matrix of the transformed data reflects the scattering strength of an object in said field of view at a corresponding range with a corresponding radial velocity, with each column of the matrix of transformed data representing range bins and each row of the transformed data representing velocity bins.

BRIEF DESCRIPTION OF THE DRAWINGS

FIG. 3a depicts some of the functional block diagram for the digital hardware of FIG. 3 in more detail.

FIG. 3b shows an alternative embodiment of the CAR processing where multiple antenna elements (in a subarray of antenna elements) share a single 1-bit phase shifter.

FIG. 4 depicts a repetitive series of equal frequency steps where N codes are utilized at each frequency step, N being preferable equal the number of synthesized beams within the field of view is especially convenient when used with the type II CAR coding technology discussed below.

FIG. 6 is a block diagram showing a conventional digital beamforming (DBF) radar.

DETAILED DESCRIPTION

Figure 1:
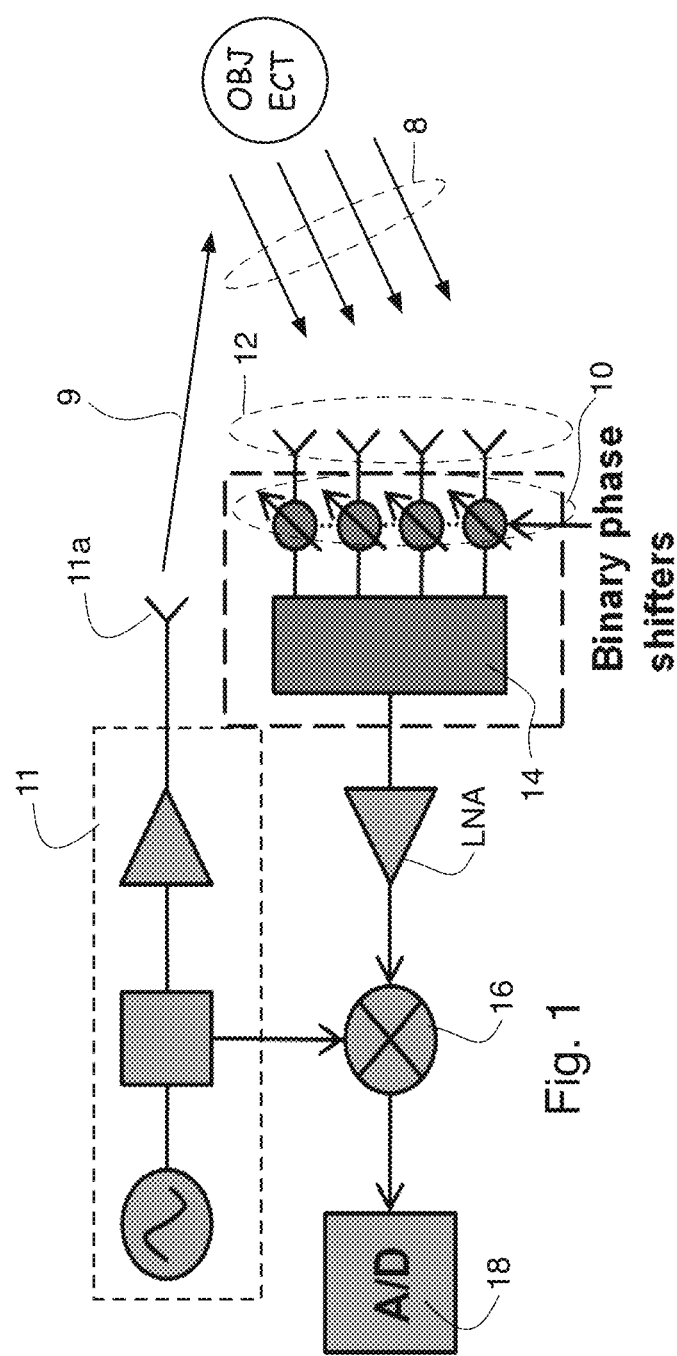
FIG. 1 shows a block diagram of CAR, with CAR coding on receive only for simplicity's sake.

FIG. 1 shows a block diagram of CAR, with CAR coding on receive only which simplifies the hardware which is utilized. A radar signal 9 is transmitted from an antenna element 11a associated with a radar transmitter 11. The transmitted signal 9 covers a field of view (FOV) and energy is scattered from one or more objects within the FOV, which scattered energy 8 is received by an array of receiving radar antenna elements 12 associated with a radar receiver. In some embodiments, antenna elements may be shared by both the radar transmitter and the radar receiver (with appropriate switching to isolate the receiver from the relatively high energy signal which is typically transmitted by the transmitter to keep from damaging the receiver by that high energy signal). The array of receiving radar antenna elements 12, in practice, is preferably a two dimensional array, but a one dimensional array is more convenient for analysis and simulation and may be used in practice.

Each of the received signals is phase shifted (modulated) by either zero or 180 degrees by one of a plurality of binary (1-bit) phase shifters 10 each of which preferably located near or immediately adjacent an associated one of the antenna elements 12. The received scattered signals are thusly phase shifted (or not) depending on the state of a control word, a bit of which is applied to each binary phase shifter 10 (thus controlling whether it performs a 180 degree phase shift (or not) on the received scattered signals). The phase shifted signals downstream of the phase shifters 18 are then summed at 14 to a single RF output port in the depicted embodiment. The control word may be called an aperture code and thus the phase shifted signals downstream of the phase shifters 18 may be referred to as being "aperture coded" herein. The RF signal at the RF output port of the summer 14 may be first amplified by an optional low noise amplifier (LNA) and then down-converted (preferably to baseband) by a mixer 16 and digitized by a Analog to Digital Convertor (ADC) 18.

Figure 2:
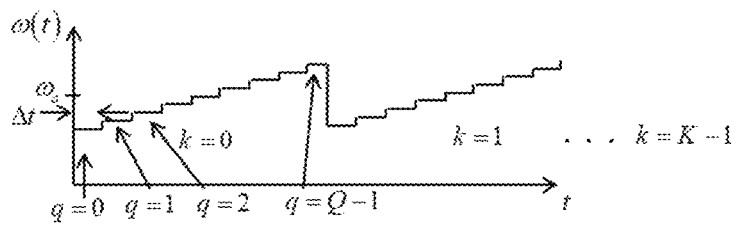
FIG. 2 depicts a repetitive series of equal frequency steps which may be used in the radar transmitter, which repetitive series of equal frequency steps is especially convenient when used with the type I CAR coding technology discussed below.

There are many possible transmitted signals 9 which may be utilized with CAR decoding on receive, but an especially convenient transmitted signal 9 is a signal which comprises a repetitive series of equal frequency steps, as shown in FIG. 2, with q being the index of a frequency step in a sweep and k being the index of a sweep in an acquisition. The frequency of the transmitted signal 9 thus may consist of a series of equal steps that are repeated with one or more codes per step, Q steps per sweep, and K sweeps per acquisition. This type of signal is appropriate for relatively short range targets so that the total round trip delay time (of signals 9 and 8) is preferably much shorter than the sweep period of the transmitted signal 9. For this type of transmitted signal, one may implement the aperture coding scheme discussed above in one of two ways.

In Type I CAR coding, one may utilize a separate code for each frequency step (a separate code for each frequency sweep may be considered a special case with identical codes repeated throughout a particular sweep). In Type II CAR coding, one transmits a set of N codes during one frequency step, and repeating same for each step and for each sweep. The codes for different steps and/or sweeps may be identical or different, although the preferred embodiment is one with repeated codes with the codes being mutually orthogonal. We will consider the digital implementation of these two coding types separately, and will consider coding on receive only for simplicity, although this invention also applies to coding on transmit. The invention is easier to implement on receive, since when used on transmit if there are several objects scattering and the objects are at different ranges, the signals will be received at different times. Typically the round trip delay to a target and back will be longer than the duration of each frequency step, so the received signals will be spread out in time. This requires more complicated correlation processing. Coding on receive only occurs at the same time for all targets, so much simpler and more efficient FFT processing can be used.

Type I CAR Coding

For a single ideal scatterer at range r, radial velocity v (note that the velocity v is unscripted while the mixer voltage is $v_m$ has a subscript), and angular position $\Omega$, the mixer output voltage with a different code for each frequency step has the form $$v_m = V e^{-j\frac{2\omega_m}{c}(r+vm\Delta t)} g_m(\Omega) \qquad \text{(Eqn. 1)}$$

$$= V e^{-j\frac{2\omega_m}{c}(r+vm\Delta t)} \sum_{n=0}^{N-1} S_{m,n} e_n(\Omega)$$

where $\omega_m$ are the radian frequency steps, $\Delta t$ (in the exponent) is the duration of each frequency step, v (in the exponent) is velocity, m is the time index, and V is the amplitude that depends on various radar parameters such as transmit power, radar cross section, antenna gain, etc. The complex field pattern produced by the $n^{th}$ antenna element is denoted $e_n(\Omega)$, where $\Omega$ is shorthand notation for the spherical coordinate angles $\theta, \phi$. The complex field pattern produced by the receive elements, phase shifters, and summation network may then be written $$g_m(\Omega) = \sum_{n=0}^{N-1} S_{m,n} e_n(\Omega), \quad \text{(Eqn. 2)}$$

where $S_{m,n}$ is a "coding matrix," defined as the complex transmission coefficient (i.e., S21) from the $n^{th}$ antenna element 10 to the summation network 14 output for the $m^{th}$ code.

We define Q as the number of frequency steps per radar sweep and K as the number of sweeps per acquisition. In practice, the parameters Q and K are selected to provide a desired number of range and velocity bins. The time index m may be expressed in terms of the indices for the frequency step q and sweep k as m=q+kQ. The range and velocity resolutions are given by $$\Delta r = \frac{c}{2\Delta f}, \quad \text{(Eqn. 3)}$$

$$\Delta v = \frac{c}{2f_o KQN\Delta t}.$$

Mathematically, the range and velocity variables run over positive and negative values, even though the negative range variables are meaningless in practice, so the maximum range and velocities (determined by the Nyquist criterion) are given by $$r_{max} = \tfrac{1}{2} Q \Delta r, \; v_{max} = \tfrac{1}{2} K \Delta v \quad \text{(Eqn. 4)}$$

Estimates of range, velocity, and bearing angles from the mixer signal Eqn. 1 are obtained by first multiplying the mixer signal by a set of "signal masks," $s_m(\Omega')$ (note the lower case s) one for each of the desired receive beam directions $\Omega'$:

$$\tilde{v}_m = v_m s_m(\Omega'). \quad \text{(Eqn. 5)}$$

We then organize the mixer voltage samples in matrix form with indices q, indicating the corresponding frequency step of the transmitted signal, and k indicating the corresponding sweep. Thus, the matrix values following the signal masking may be indicated by $$\tilde{v}_{q,k}(\Omega') = v_{q,k} s_{q,k}(\Omega'). \quad \text{(Eqn. 5a)}$$

Next we then multiply Eqn. 5a by a function $f_{q,k}(r',v')$ of reference range r' and velocity v' and sum over all values of the indices q and k to form an ambiguity function:

$$X(r', v', \Omega') = \sum_{q=0}^{Q-1} \sum_{k=0}^{K-1} \tilde{v}_{q,k}(\Omega') f_{q,k}(r', v'). \quad \text{(Eqn. 6)}$$

Peaks of the ambiguity function indicate values of range and velocity at which a strong scatter is located, within the beam direction $\Omega'$. One typically discretizes the antenna array field of view into discrete beam directions $\Omega = \Omega'_s$ using traditional techniques that are well known to those skilled in the art and that depend on details of the array design (aperture size, element size, etc.). The primed direction $(\Omega'_s)$ indicates where the radar looks for scatterers. The unprimed direction $(\Omega)$ is the direction of the actual scatterer. See Eqn. 1. When many scatterers are present the contributions from each add because the radar transceiver has a linear response, as is well known to those skilled in the art.

Once the beam directions are determined, there are many ways to choose the functions $s_{m,s} = s_m(\Omega'_s)$. One method is to use the conjugate of the spatial part of the signal from Eqn. 1:

$$s_{m,s} = g_m^*(\Omega'_s) = \sum_{n=0}^{N-1} S_{m,n}^* e_n^*(\Omega'_s). \quad \text{(Eqn. 7)}$$

Another method is to use a pseudo-inverse of the coding matrix to obtain estimates of the element signals, and then weight them with an amplitude taper $w_n$ for sidelobe control. For this case the choice is $$s_{m,s} = \sum_{n=0}^{N-1} w_n \left( (S^H S)^{-1} S^H \right)_{n,m} e_n^*(\Omega'_s) \quad \text{(Eqn. 8)}$$

where $(S^H S)^{-1} S^H$ is the pseudo-inverse of the coding matrix.

There are also many ways to choose the function $f_{q,k}(r',v')$ that will provide estimates for the range and velocity, but this is similar to the processing utilized in conventional radar and we may use any of the conventional methods. For a matched filter processor, the function f is given by:

$$f_{q,k}(r', v') = e^{j\frac{2\omega_q}{c}(r' + (q+kQ)v'\Delta t)}. \quad \text{(Eqn. 8a)}$$

In practice, reference range r' and velocity v' are chosen at discrete points, typically on a grid. The discretization of range and velocity produces what are commonly referred to as "range bins" and "velocity bins." When we multiply the masked digital samples by the function in Eqn. 8a and sum over all values of q and k as indicated in Eqn. 6, we are performing a mathematical transformation of the 2D matrix of digital values $\tilde{v}_{q,k}$. The result of this transformation is an ambiguity function matrix for each beam position $\Omega'_s$ whose two subscripts refer to specific range and velocity bins with the corresponding amplitude indicating the scattering strength of an object in that range and velocity bin. One can show that because we preferably utilize a linear FM sweep transmit radar and because we divide the range and velocity spaces into equal sized bins, Eqn. 8a is mathematically very similar to a 2D Fast Fourier Transform (FFT), and we may utilize a 2D FFT instead of the matched filter function shown in Eqn. 8a with negligible error.

To simplify this discussion we will assume matched filter processing to determine the range, radial velocity, and bearing angles of the object(s) within the field of view of the transmit radar. In practice, it is much more efficient in terms of processing time and hardware complexity to utilize FFTs for the range/velocity processing instead of a true matched filter. But this approach is valid for short range radars where the round trip time delay is short relative to the sweep period (for example, less than 10% of a single sweep period, such as in automotive radar). The use of FFTs for range/velocity processing is typically preferred, but since it is well known to those skilled in the art, it will not be described in detail herein for ease of discussion. The matched filter option will be used in what follows because its description is easier to present and understand.

For matched filter processing of range and velocity, after we apply the beam masks according to Eqn. 5, we arrange the sequence of masked digital data samples $\tilde{v}_m$ in matrix form $\tilde{v}_{q,k}$, and apply a transformation to the matrix by multiplying the matrix elements by a phase factor that is the conjugate of the phase that we expect from a target at range r' and velocity v' (given by Eqn. 8a) and sum over all the samples. The result is an ambiguity function that estimates the strength of the scatterer at range r', velocity v', and bearing angles $\Omega'$:

$$X(r', v', \Omega') = \sum_{q=0}^{Q-1} \sum_{k=0}^{K-1} \tilde{v}_{q,k} e^{j\frac{2\omega_q}{c}(r'+v'(q+kQ)\Delta t)} \quad \text{(Eqn. 9)}$$

$$\to X(\delta r, \delta v, \Omega, \Omega') =$$

$$V \sum_{q=0}^{Q-1} \sum_{k=0}^{K-1} e^{-j\frac{2\omega_q}{c}(\delta r+\delta v(q+kQ)\Delta t)} g_{q+kQ}(\Omega) g^*_{q+kQ}(\Omega').$$

where $\delta r = r - r'$ and $\delta v = v - v'$ are the differences between the object range and velocity and the reference range and velocity, and we have assumed Eqn. 7 for the choice of beam mask.

To show that this processing approach produces a sharp peak when the reference range, velocity, and angles are equal to the object range, velocity, and angles we will assume that the coding matrix contains values of either +1 or −1 with 50% probability for each. This choice is the preferred embodiment of the coding matrix, although other choices are possible, such as N columns of an M×M Hadamard matrix avoiding the column of equal values. We will then show that the ambiguity function has the desired characteristics in an average sense. We will scale the coding matrix so that the sum of the squares of any row is unity, which will be the case (ideally) if the coding matrix values for the $m^{th}$ row and $n^{th}$ column represent the scattering parameter from the nth antenna element through the binary phase shifter to the summation network output without dissipative losses:

$$S_{m,n} = \frac{\varepsilon_{m,n}}{\sqrt{N}}. \quad \text{(Eqn. 10)}$$

where $\varepsilon_{m,n}$ is either +1 or −1 with 50% probability. Note that $\langle \varepsilon_{m,n} \varepsilon_{m,n'} \rangle = \delta_{n,n'}$, where the brackets $\langle \ \rangle$ denote an ensemble average value. Also, to simplify the mathematics we utilize a single index m=q+kQ. Inserting Eqn. 10 into Eqn. 9 using Eqn. 2 and computing the ensemble average value we have:

$$\langle X(\delta r, \delta v, \Omega, \Omega') \rangle = V \sum_{m=0}^{M-1} e^{-j\frac{2\omega_m}{c}(\delta r+\delta vm\Delta t)} \langle g_m(\Omega) g^*_m(\Omega') \rangle = \quad \text{(Eqn. 11)}$$

$$V \sum_{m=0}^{M-1} e^{-j\frac{2\omega_m}{c}(\delta r+\delta vm\Delta t)} \sum_{n=0}^{N-1} \sum_{n'=0}^{N-1} \langle S_{m,n} S^*_{m,n'} \rangle e_n(\Omega) e^*_{n'}(\Omega') =$$

-continued $$V \sum_{m=0}^{M-1} e^{-j\frac{2\omega_m}{c}(\delta r+\delta vm\Delta t)} \frac{1}{N} \sum_{n=0}^{N-1} e_n(\Omega) e^*_{n'}(\Omega')$$

This is the same form of the ambiguity function as for a conventional radar sensor. The summation over m gives the range and velocity estimates, with a peak value at $\delta r = \delta v = 0$. Instead of the matched filter approach, it is preferable to utilize FFT processing on the beam masked signal $\tilde{v}_m$, a technique that is well known to those skilled in radar signal processing. The FFT approach to the processing is preferred due to the low latency and efficient use of hardware. The summation over n gives the angular beam pattern of an antenna array with a uniformly weighted aperture as a function of $\Omega'$ with a peak value located at $\Omega$. Thus we have shown that, on average, the Type I CAR processing disclosed herein gives the same information as conventional radar signal processing. If FFT processing is used instead of matched filter processing, the results will be similar because the complex exponentials of the FFT are nearly the same as the function $$f_m(r', v') = e^{j\frac{2\omega_m}{c}(r'+mv'\Delta t)}$$

used for the matched filter, and the processing speed would be reduced. Although Type I coding produces the same results as conventional radar in an average sense, the ambiguity function fluctuates about the mean value, an effect referred to as residual ambiguity (and sometimes referred to as multiplicative noise). This effect adds pseudorandom "noise" to the computed radar estimates of range, velocity, and angles and this may pseudorandom "noise" be mitigated using Type II coding, described below. The primary advantage of CAR is that it provides similar results to conventional radar, which results are obtained using only a single transceiver, binary (as opposed to multi-bit) phase shifters, and range, velocity, and bearing angle estimates that are made from data collected in a single acquisition.

Figure 3:
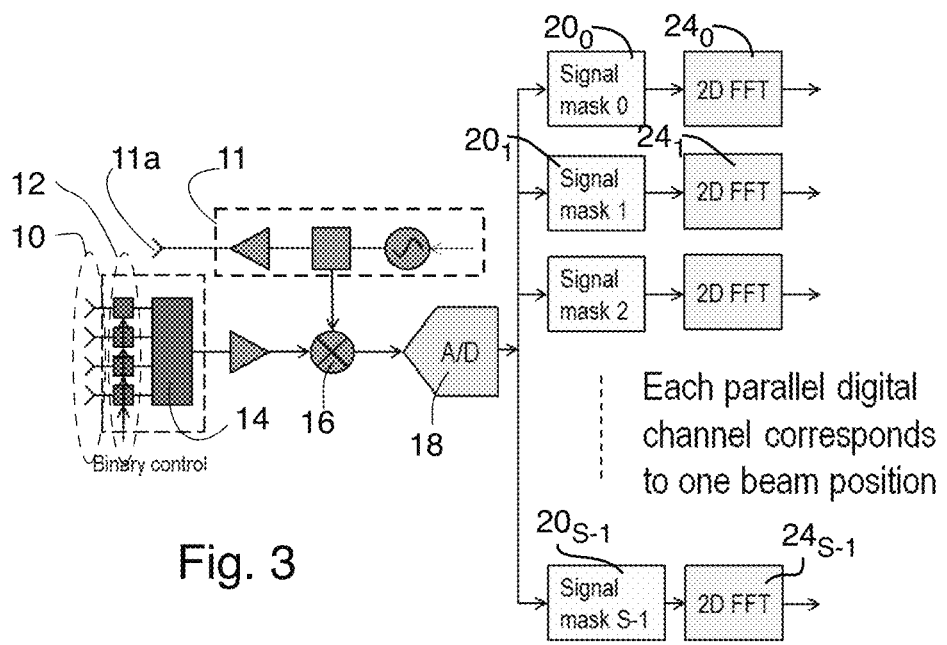
FIG. 3 depicts functional block diagram for the digital hardware which may be utilized to practice the type I CAR coding discussed herein.

This Type I CAR processing approach may be conceptually implemented in digital hardware as depicted by the functional block diagram of FIG. 3 or it may be implemented in software. Even if implemented in software, software of course requires hardware and a hardware suite used to implement FIG. 3 may include one or more general purpose CPUs in addition to one or more Application Specific ICs (ASICs) designed to handle the FFT processing with greater ease than if only one or more CPUs were used.

After the mixer output signal is digitized by an analog to digital converter (ADC) 18, the digital signal is split into S parallel channels, with as many channels as beam directions to be processed in parallel. So each of the S parallel channels corresponds to a single synthesized beam position. For each channel we first apply a signal mask function $20_0 \ldots 20_{S-1}$, which multiplies each of the complex signal samples $v_m$ by the complex signal mask number $s_{m,s}$ stored in memory (m is the index for the signal sample and s is the index for the beam direction channel). The mixer 16 has both in-phase (I) and quadrature (Q) outputs, so that the mixer signal samples are complex, and the digital multiplications in the signal mask function $20_1 \ldots 20_{S-1}$ are therefore complex. See FIG. 3a where the mixer 16 is depicted with separate I and Q outputs and each output is applied to a separate ADC 18i and 18q. A single ADC 18 is often depicted in the art as being coupled with a mixer with I and Q outputs (as is done in the embodiments of FIG. 3 and FIG. 3c) it is understood both the I and Q channels are digitized.

After the signal mask is applied at $20_0 \ldots 20_{S-1}$, the M signal samples are separated (at east conceptually) into K rows of Q samples per row and a 2D FFT is preferably applied to that matrix of data at blocks $24_0 \ldots 24_{S-1}$. M=Q times K and S can be chosen independently, but will typically be equal to the number of antenna elements 10. Following the FFT at blocks $24_0 \ldots 24_{S-1}$, the elements down each column give the scattering strength at various range values for a particular velocity and the elements across rows give the scattering strength at various velocity values for each range bin. The results of the processing are estimates of the object scattering strength at all combinations of ranges, velocities, and beam positions. The word "complex" is used here in its mathematical sense, that is, the corresponding values have real and imaginary parts.

Preferably, there is a one-to-one relationship between antenna elements 10 and phase shifters 12 as is depicted by FIG. 3. But it is possible, in some embodiments (see FIG. 3a), to have several antenna elements 10 grouped together (summed in a subarray $10_{SA}$) that are then coupled with a single phase shifter 12. The drawback to this approach is the appearance of grating lobes in the element patterns because the subarrays would be spaced greater than $\lambda/2$ apart from one another (where $\lambda$ is the wavelength of the nominal frequency of the radar system). Grating lobes are undesirable because they reduce gain and produce or receive spurious radiation in unwanted directions. The advantage of the embodiment of FIG. 3a is a lower cost.

Figure 3C:
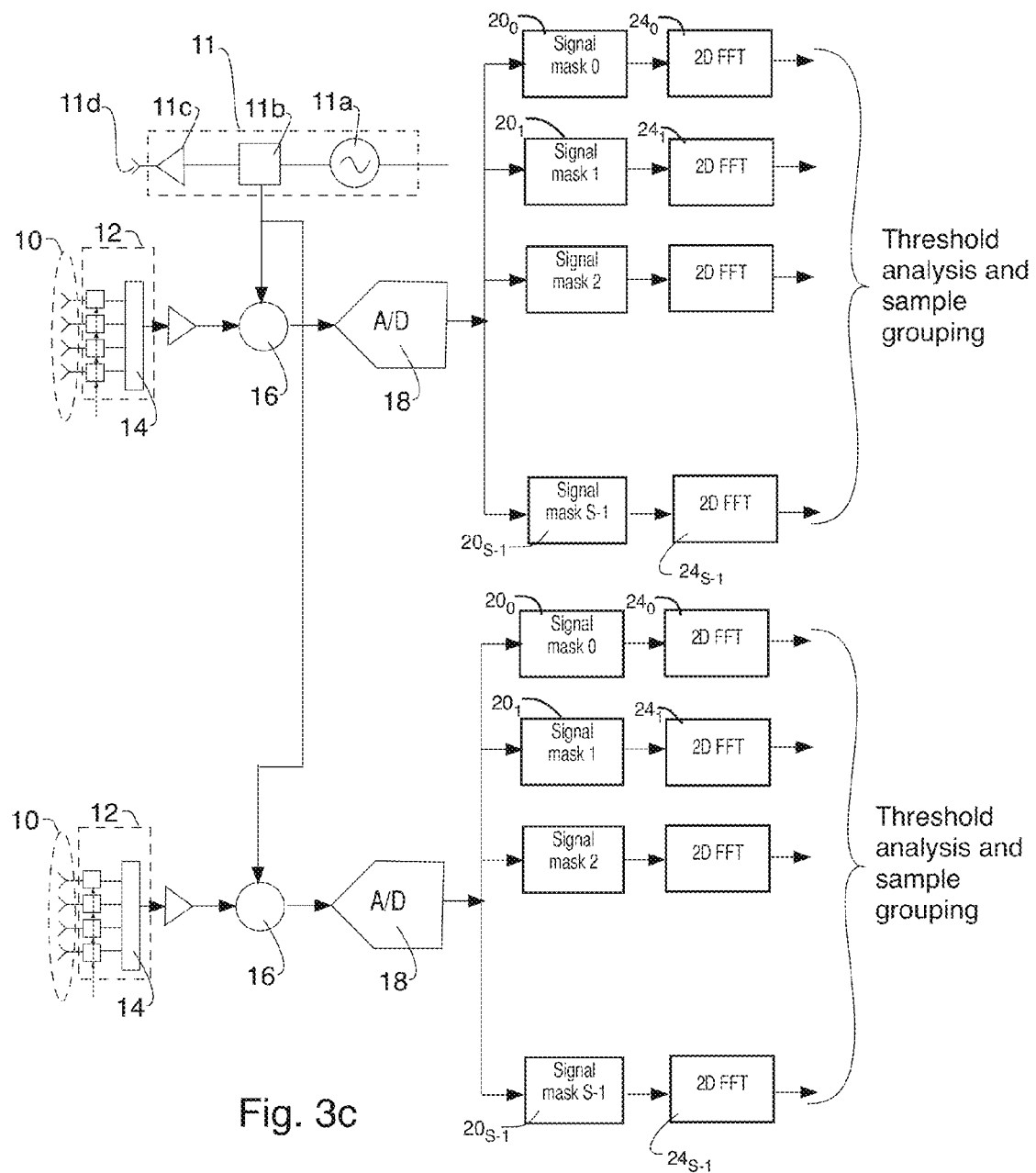
FIG. 3c shows another alternative embodiment of the CAR processing technique described herein where a one to one relationship between antenna elements and 1-bit phase shifters is maintained, but where outputs of the antenna elements are the summed down to more than one port which ports are digitized independently by more than one A/D converter.

FIG. 3c shows another alternative embodiment of the CAR processing technique described herein where a one to one relationship between antenna elements and 1-bit phase shifters is maintained, but where outputs of the antenna elements are the summed down to more than one port which ports are digitized independently by more than one A/D convertor 18. The advantage of this approach is an improvement in signal to noise ratio due to more than one receive channel, each collecting energy independently. The disadvantage is increased cost.

Only a few antenna elements 10 and phase shifters 12 are depicted in FIGS. 3, 3b and 3c, it being understood that the number of antenna elements 10 and phase shifters 12 may be very large in some embodiments.

Type II CAR Coding

In the Type II CAR coding scheme, N codes are utilized during transmit at each frequency step, as indicated in FIG. 4, where N is preferably equal to the number of 1-bit phase shifters. The N one-bit transmit codes may be selected in the same manner as the one-bit receive codes applied to the one-bit phase shifters 12 (the selection may be pseudo-random, for example), but the resulting two matrices should not be chosen to be the same. Furthermore, since the transmit-receive code combination is just the product of the separate transmit and receive codes (it is well known to those skilled in the art that radar response is proportional to the product of the transmit modulation and receive modulation), the overall coding matrix is the element by element product of the transmit code matrix and the receive code matrix. One should therefore ensure that the overall coding matrix contains linearly independent columns.

Using more codes than the number of 1-bit phase shifters 12 does not result in further improvement in the reduction of residual ambiguity, but using fewer codes than the number of phase shifters 12 will not eliminate residual ambiguity, but will reduce it. These N codes (on transmit) and the binary control data applied to the 1-bit phase shifters 12 are single bit random codes which may be Hadarmard, pseudo-random, etc. These N codes may be repeated for each of the frequency steps of each of the sweeps during transmit. It is also possible to use different codes for each of the frequency steps, although this is unnecessary. In the following, as the preferred embodiment, we will assume the same set of N codes is used for all frequency steps and sweeps. For a single ideal scatterer at range r, radial velocity v, and angular position $\Omega$, the mixer output voltage with N codes at each frequency step has the form $$v_{n,m} = V e^{-j\frac{2\omega_m}{c}(r+v(n+mN)\Delta t)} g_n(\Omega) \quad \text{(Eqn. 12)}$$
$$= V e^{-j\frac{2\omega_m}{c}(r+v(n+mN)\Delta t)} \sum_{n'=0}^{N-1} S_{n,n'} e_{n'}(\Omega)$$

where n is the code index, $\omega_m$ are the radian frequency steps, $\Delta t$ is now the duration of each code period, and V is the amplitude that depends on various radar parameters such as transmit power, radar cross section, antenna gain, etc. Note that the total length of the signal is NM (N times M) samples.

To process this signal, we first apply the signal mask $s_n(\Omega')$ as before for each desired beam direction $\Omega'$, but now we sum the results for each set of N codes, forming a set of signals of length M, one for each beam direction:

$$\tilde{v}_m = \sum_{n=0}^{N-1} v_{n,m} s_n(\Omega') \quad \text{(Eqn. 13)}$$

This procedure is almost identical to that of the Type I coding, the only difference being that, after multiplying by the signal mask, we sum sets of N successive masked signal samples. This additional summation adds an insignificant amount of additional complexity. The signal mask values may be chosen with the same considerations as for Type I signals. One would typically choose the number of codes N equal to the number of beam positions S so that $s_{n,s}=s_n(\Omega'_s)$ forms a square matrix. One may also choose the square coding matrix to be orthogonal, and this is our preferred embodiment.

To show that the result of this coding scheme and processing has the desired characteristics, we substitute Eqn. 12 into Eqn. 13 and utilize the matched filter choice of signal $$\text{masks } s_n(\Omega') = \sum_{p=0}^{N-1} S^*_{n,p} e^*_p(\Omega'): \quad \text{(Eqn. 14)}$$

$$\tilde{v}_m = V \sum_{n=0}^{N-1} e^{-j\frac{2\omega_m}{c}(r+v(n+mN)\Delta t)} \sum_{n'=0}^{N-1} S_{n,n'} e_{n'}(\Omega) \sum_{p=0}^{N-1} S^*_{n,p} e^*_p(\Omega')$$
$$= V \sum_{n'=0}^{N-1} \sum_{p=0}^{N-1} e_{n'}(\Omega) e^*_p(\Omega') \sum_{n=0}^{N-1} S_{n,n'} S^*_{n,p} e^{-j\frac{2\omega_m}{c}(r+v(n+mN)\Delta t)}$$

For practical radars the total acquisition time is designed to be short enough so that the fastest targets do not move through many range bins (preferably only one) since such movements blur the radar response. Given this fact, the movement during a single code duration $\Delta t$ is often negligibly small. From Eqn. 14, if we ensure that $$\frac{2\omega_o}{c} v_{max} N \Delta t \ll 1, \qquad \text{(Eqn. 15)}$$

then the last exponential factor in Eqn. 14 that depends on n may be neglected with little error. Using Eqn. 2 and Eqn. 3, then the condition of Eqn. 15 may be expressed as $$Q \gg \pi, \qquad \text{(Eqn. 16)}$$

a condition that is often satisfied in practice. Assuming this is the case, and using the fact that we have chosen an orthogonal coding matrix so that $S^H S = I/N$, where I is the identity matrix, the M masked signals for each beam position become $$\tilde{v}_m = V e^{-j \frac{2\omega_m}{c}(r + mN v \Delta t)} \sum_{n'=0}^{N-1} e_{n'}(\Omega) e_{n'}^*(\Omega'). \qquad \text{(Eqn. 17)}$$

These signals may then be organized into matrix form and processed by FFT (or some other scheme) to provide range/velocity information, as described above. For simplicity we will utilize the matched filter approach. Multiplying Eqn. 17 by the phase factor as in Eqn. 9, we obtain the ambiguity function $$X(\delta r, \delta v, \Omega, \Omega') = \qquad \text{(Eqn. 18)}$$

$$V \sum_{m=0}^{M-1} e^{-j \frac{2\omega_m}{c}(\delta r + mN\delta v \Delta t)} \frac{1}{N} \sum_{n'=0}^{N-1} e_{n'}(\Omega) e_{n'}^*(\Omega')$$

which is the same as Eqn. 11, although this result does not contain the pseudo-random variations (i.e., residual ambiguity) of Type I coding. We point out that the digital processing hardware implementation is nearly identical to that of the Type I coding described above and shown in FIG. 3, except for the need for only one additional adder for each channel.

One of the primary advantages of CAR over a conventional digital beamforming (DBF) radar (depicted by FIG. 6) is a result of the simplicity of the digital processing especially when implemented according to the present invention. DBF radar utilizes a separate receiver and an ADC behind each receiving element. A central processor unit (CPU) may be used to processes the data from all of the elements to synthesize beams in the desired directions and (often) utilizes FFTs to provide range/velocity information. To provide a comparison of DBF and CAR, consider the N mixer output signals from a digital beamforming array that utilizes the same type of signal described above for CAR:

$$v_{m,n} = V e^{-j \frac{2\omega_m}{c}(r + mv\Delta t)} g_n(\Omega). \qquad \text{(Eqn. 19)}$$

Although this has a similar form to Eqn. 12, the meaning of the indices is different. Here the index n refers to the antenna element and $\Delta t$ is the period of a frequency step. The $g_n(\Omega)$ is the complex antenna pattern for the nth antenna element. To form a single beam we must apply a set of weights across all of the element signals and sum them, and this should be repeated for every beam position. For matched filter beamforming we weight the element signals according to $$\tilde{v}_{m,s} = \sum_{n=0}^{N-1} v_{m,n} g_n^*(\Omega_s') \qquad \text{(Eqn. 20)}$$

and then process the resulting weighted signals using FFTs or other conventional range/velocity processing techniques known in the art. Conventional FFT processing is indicated in block diagram form in FIG. 5 at blocks $24_0 \ldots 24_{S-1}$ thereof, which figure shall now be discussed in more detail.

Figure 5:
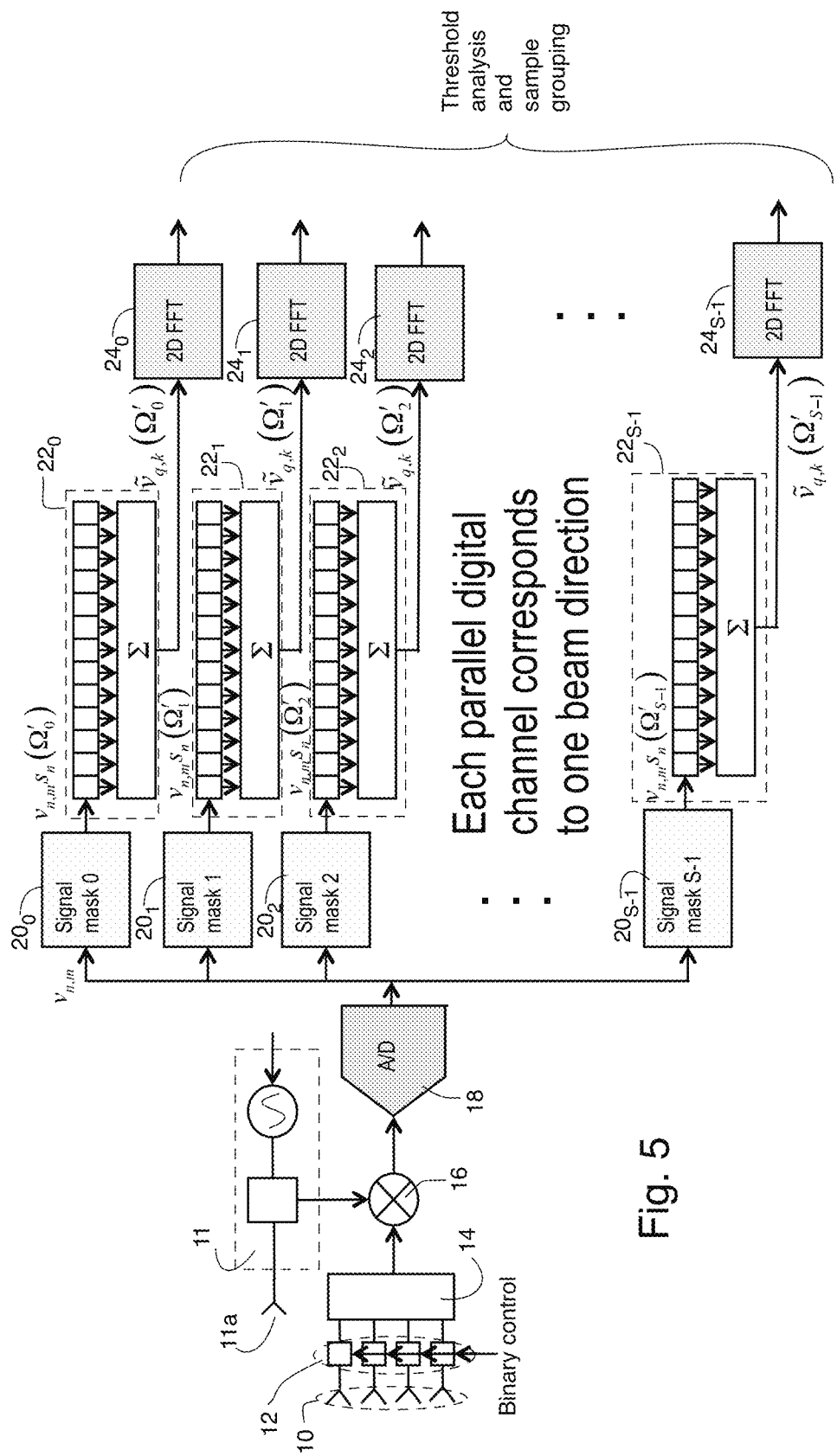
FIG. 5 depicts a functional block diagram for the digital hardware which may be utilized to practice the type II CAR coding discussed herein.

This Type II CAR processing approach may be conceptually implemented in digital hardware as depicted by the functional block diagram of FIG. 5 or it may be implemented in software using one or more general purpose CPUs and possibly also one or more ASICs as is discussed above with reference to FIG. 3. FIG. 5 is rather similar to FIG. 3, which depicts a conceptual implementation of Type I CAR processing, but in FIG. 5 there is an added set of blocks $22_0 \ldots 22_{S-1}$ which do not appear in FIG. 3, which are needed for Type II CAR processing. Otherwise, the two figures are basically identical and use the same element numbers to refer to common elements between the Type I CAR and Type II CAR implementations.

In FIG. 5, after the mixer 16 output signal is digitized by an analog to digital converter (ADC) 18, the digital signal is split into S parallel channels, with as many channels as beam directions to be processed in parallel, as dome with Type I CAR. So each of the S parallel channels corresponds to a single synthesized beam position. For each channel we first apply a signal mask function $20_0 \ldots 20_{S-1}$, which multiplies each of the complex signal samples $v_m$ by the complex signal mask number $s_{m,s}$ stored in memory (m is the index for the signal sample and s is the index for the beam direction channel). The mixer 16 has both in-phase (I) and quadrature (Q) outputs, so that the mixer signal samples are complex, and the digital multiplications in the signal mask function $20_1 \ldots 20_{S-1}$ are therefore complex. See FIG. 3a where the mixer 16 is depicted with separate I and Q outputs and each output is applied to a separate ADC 18i and 18q. A single ADC 18 is often depicted in the art as being coupled with a mixer with I and Q outputs (as is done in the embodiments of FIGS. 3, 5 and FIG. 3c) it is understood both the I and Q channels are digitized.

After the signal masks are applied at $20_0 \ldots 20_{S-1}$, the M signal samples are separated (at least conceptually) into K rows of Q samples per row and a 2D FFT is preferably applied to the matrix of data at blocks $24_0 \ldots 24_{S-1}$, as done in Type I CAR, except that N data samples are summed together at blocks $22_0 \ldots 22_{S-1}$, after the signal masks are applied at block $20_0 \ldots 20_{S-1}$, and before applying the results of thus summation to 2D FFT at blocks $24_0 \ldots 24_{S-1}$. See U.S. patent application Ser. No. 14/561,142 filed on the same date as this application and entitled "Method and Apparatus for Reducing Noise in a Coded Aperture Radar" for a more in depth discussion of the hardware of FIG. 5 herein (which appears as FIG. 3 in that application).

CAR processing requires fewer digital computations than conventional DBF processing (see FIG. 6), and the advantage can be highly significant for large arrays. For CAR, we multiply each ADC sample by a complex number, and for Type II coding we then add groups of N masked signals.

Since adds are much more time and hardware efficient than multiplies, it is sufficient to neglect the adds and only count multiplies when comparing computational complexities. The CAR signal mask requires the same number of multiplies as ADC samples, which is M for Type I coding and MN for Type II coding. In contrast DBF requires N multiplies (and 1 add) for each ADC sample, repeated for each of the N beams. This is a total of $N^2$ multiples for each sample (assuming the number of beams S is the same as the number of antenna elements N, as will often be the case). There are a total of M samples per acquisition, so the total number of multiplies is $MN^2$. Thus, we see that CAR has an advantage in computational requirements, requiring fewer computations than DBF by a factor of $N^2$ for Type I CAR and N for Type II CAR.

For both Type I CAR and N for Type II CAR, following the 2D FFT processing, the significant scatterers are typically identified by applying "thresholding" to the data outputted from the 2D FFT processing where any samples crossing a chosen threshold are retained and samples falling below that threshold are omitted. Additional processing may be applied to group significant samples together in order to identify single, large objects that may produce many different, but related, scattering events. Using such processing techniques, the radar sensor can provide functions such as, for example, identification of objects on a collision path with the host vehicle.

This concludes the description of embodiments of the present invention. The foregoing description of these embodiments has been presented for the purposes of illustration and description. It is not intended to be exhaustive or to limit the invention to the precise form or methods disclosed. Many modifications and variations are possible in light of the above teachings. It is intended that the scope of the invention be limited not by this detailed description, but rather by the claims appended hereto.

What is claimed is:

1. A method of processing radar signals reflected from one or more objects in a field of view of a radar transmitter transmitting the radar signals, the method comprising:

receiving and modulating the radar signals reflected from the one or more objects by a plurality of binary phase shifters to produce a set of modulated signals, the binary phase shifters being controlled by binary coding data;

summing the modulated signals and down converting them by a mixer producing in-phase and quadrature output signals which are each sampled and digitized by one or more A/D convertors to produce a set of real and imaginary digital values corresponding to the in-phase and quadrature output signals produced by the mixer during an acquisition of the field of view;

distributing real and imaginary digital values corresponding to the in-phase and quadrature output signals produced by the mixer into a number of channels, the number of channels being equal to a number of desired radar beam directions to be processed concurrently and each channel having real and imaginary digital values corresponding to the digitized in-phase and quadrature signals output by the mixer;

performing a complex multiplication using the real and imaginary digital values in each channel as one multiplicand and using real and imaginary values of a signal mask as the other multiplicand, the signal mask being different for each channel and for each channel being selected to produce a desired beam with desired characteristics for each channel, each complex multiplication producing a multiplication result which has both real and imaginary parts; and transforming the real and imaginary parts of said multiplication results or of a summation of said multiplication results in said set or matrix using a transformational function which produces transformed data, conceptually as a set or matrix, wherein each position of the set or matrix of the transformed data reflects the scattering strength of an object in said field of view at a corresponding range with a corresponding radial velocity, with each column of the matrix of transformed data representing range bins and each row of the transformed data representing velocity bins.

2. The method of claim 1 wherein said binary coding data comprises a matrix of elements which are randomly or pseudo-randomly selected.

3. The method of claim 2 wherein said elements comprise a Hadamard code.

4. The method of claim 2 wherein said elements are pseudo randomly selected with a 50% probability of each pseudo random binary state for each element in said matrix of elements.

5. The method of claim 1 wherein the real and imaginary values of said signal mask are stored in memory.

6. The method of claim 1 wherein said desired characteristics of the desired beam for each channel comprises a desired beam direction with desired beam side lobe characteristic or characteristics.

7. The method of claim 1 wherein said transformational function comprises matched filter processing or an approximation of matched filter processing.

8. The method of claim 7 wherein the matched filter processing is approximated by a Fast Fourier Transform (FFT) function.

9. The method of claim 8 wherein the FFT function is a 2D FFT function performed on the real and imaginary parts of the multiplication result for each of said channels.

10. The method of claim 1 wherein a number of said binary phase shifters are utilized and a number of said channels are provided and further wherein the number of said channels is equal to the number of said binary phase shifters.

11. The method of claim 1 wherein transmitted radar signals are generated which reflect from said object(s) in said field of view, the transmitted radar signals being generated in sweeps to cover said field of view, and wherein the transmitted radar signals in each sweep being frequency modulated with Q frequency steps per sweep.

12. The method of claim 11 wherein K sweeps of said transmitted radar signals are generated to complete an acquisition of said object(s) in said field of view.

13. The method of claim 12 wherein the product of Q times K equals the number of range and velocity bins.

14. The method of claim 12 wherein the number of range and velocity bins is selected independently of the number of desired radar beam directions.

15. The method of claim 13 wherein for each frequency step of the transmitted radar signal in a sweep thereof, N codes are transmitted in the transmitted radar signals, and wherein after the multiplication result is obtained for each channel, N multi-bit multiplication results are summed together in each channel to produce said summation of the multiplication results for each of said channels, the summation of the multiplication results for each said channel containing real and imaginary parts, the real and imaginary parts of the summation of the multiplication results for each channel being applied to one of said transformational function.

16. The method of claim 15 wherein said binary coding data comprises a matrix of elements which are randomly or pseudo-randomly selected.

17. The method of claim 16 wherein said elements comprise a Hadamard code.

18. The method of claim 16 wherein said elements are pseudo randomly selected with a 50% probably of each pseudo random binary state for each element in said matrix of elements.

19. The method of claim 15 wherein the real and imaginary values of said signal mask are stored in memory.

20. The method of claim 15 wherein said desired characteristics of the desired beam for each channel comprises a desired beam direction with desired beam side lobe characteristic or characteristics.

21. The method of claim 15 wherein said transformational function comprises matched filter processing or an approximation of matched filter processing.

22. The method of claim 21 wherein the matched filter processing is approximated by a Fast Fourier Transform (FFT) function.

23. The method of claim 22 wherein the FFT function is a 2D FFT function performed on the real and imaginary parts of the multiplication result for each of said channels.

24. The method of claim 15 wherein a number of said binary phase shifters are utilized and a number of said channels are provided and further wherein the number of said channels is equal to the number of said binary phase shifters.

25. A method of processing radar signals reflected from one or more objects in a field of view of a radar transmitter transmitting the radar signals, the method comprising:
   receiving and modulating the radar signals reflected from the one or more objects by a plurality of binary phase shifters to produce a set of modulated signals, the binary phase shifters being controlled by binary coding data;
   summing the modulated signals and down converting them by a mixer producing in-phase and quadrature output signals which are each sampled and digitized by one or more A/D convertors to produce a set of real and imaginary digital values corresponding to the in-phase and quadrature output signals produced by the mixer during an acquisition of the field of view;
   distributing real and imaginary digital values corresponding to the in-phase and quadrature output signals produced by the mixer into a number of channels, the number of channels being equal to a number of desired radar beam directions to be processed concurrently and each channel having real and imaginary digital values corresponding to the digitized in-phase and quadrature signals output by the mixer;
   performing a complex multiplication using the real and imaginary digital values in each channel as one multiplicand and using real and imaginary values of a signal mask as the other multiplicand, the signal mask being different for each channel and for each channel being selected to produce a desired beam with desired characteristics for each channel, each complex multiplication producing a multi-bit multiplication result which has both real and imaginary parts,
   summing a plurality of multi-bit multiplication results together in each channel to produce a summation of the plurality multiplication results for each of said channels, the summation of the plurality of multiplication results being at least conceptually organizable into a two dimensional set or matrix with each column of the set or matrix corresponding to frequency steps of the transmitted radar signal and each row of the matrix corresponding to a different sweep of the transmitted radar signal; and
   transforming the real and imaginary parts of the summation of the plurality of multiplication results in said set or matrix using a transformational function which produces a set or matrix of transformed data, wherein each position of the set or matrix of the transformed data reflects the scattering strength of an object in said field of view at a corresponding range with a corresponding radial velocity.

26. An apparatus for processing radar signals reflected from one or more objects in a field of view of a radar transmitter transmitting the radar signals, the apparatus comprising:
   a. a plurality of antenna elements for receiving the radar signals reflected from the one or more objects;
   b. a plurality of one bit modulators for modulating received radar signals to produce a set of modulated signals, the one bit phase shifters being controlled by binary coding data;
   c. a summation block for summing the modulated signals from the plurality of one bit modulators;
   d. a mixer coupled to summation block for producing in-phase and quadrature output signals;
   e. one or more A/D convertors which sample and digitize the in-phase and quadrature output signals from the mixer to produce a set of real and imaginary digital values corresponding to the in-phase and quadrature output signals produced by the mixer during an acquisition of the field of view;
   f. an arrangement for distributing real and imaginary digital values corresponding to the in-phase and quadrature output signals produced by the mixer into a number of channels, the number of channels being equal to a number of desired radar beam directions to be processed concurrently and each channel conveying real and imaginary digital values corresponding to the digitized in-phase and quadrature signals output by the mixer;
   g. means for performing a complex multiplication using the real and imaginary digital values in each channel as one multiplicand and using real and imaginary values of a signal mask as the other multiplicand, the signal mask being different for each channel and for each channel being selected to produce a desired beam with desired characteristics for each channel, each complex multiplication producing a multiplication result which has both real and imaginary parts, the multiplication results or a summation of the multiplication results corresponding the acquisition of the field of view being at least organizable into a two dimensional set or matrix with each column of the set or matrix corresponding to frequency steps of the transmitted radar signal and each row of the matrix corresponding to a different sweep of the transmitted radar signal;
   h. means for transforming the real and imaginary parts of said multiplication results or of a summation of said multiplication results in said set or matrix using a transformational function which produces a set or matrix of transformed data, wherein each position of the set or matrix of the transformed data reflects the scattering strength of an object in said field of view at a corresponding range with a corresponding radial velocity.

27. An apparatus for processing radar signals reflected from one or more objects in a field of view of a radar transmitter transmitting the radar signals, the apparatus comprising:
   a. means for receiving and modulating the radar signals reflected from the one or more objects by plurality of binary phase shifters to produce a set of modulated signals, the binary phase shifters being controlled by binary coding data;
   b. means for summing the modulated signals and down converting them by a mixer producing in-phase and quadrature output signals which are each sampled and digitized by one or more A/D convertors to produce a set of real and imaginary digital values corresponding to the in-phase and quadrature output signals produced by the mixer during an acquisition of the field of view;
   c. means for distributing real and imaginary digital values corresponding to the in-phase and quadrature output signals produced by the mixer into a number of channels, the number of channels being equal to a number of desired radar beam directions to be processed concurrently and each channel having real and imaginary digital values corresponding to the digitized in-phase and quadrature signals output by the mixer;
   d. means for performing a complex multiplication using the real and imaginary digital values in each channel as one multiplicand and using real and imaginary values of a signal mask as the other multiplicand, the signal mask being different for each channel and for each channel being selected to produce a desired beam with desired characteristics for each channel, each complex multiplication producing a multiplication result which has both real and imaginary parts; and
   e. means for transforming the real and imaginary parts of said multiplication results or of a summation of said multiplication results in said set or matrix using a transformational function which produces transformed data, as a set or matrix, wherein each position of the set or matrix of the transformed data reflects the scattering strength of an object in said field of view at a corresponding range with a corresponding radial velocity, with each column of the matrix of transformed data representing range bins and each row of the transformed data representing velocity bins.

28. The method of claim 1 wherein the step of summing the modulated signals and down converting them down converts the modulated signals to base band.

29. The method of claim 1 wherein the multiplication results or a summation of the multiplication results corresponding the acquisition of the field of view are organized into at least a two dimensional set or matrix of values with each column of the set or matrix corresponding to frequency steps of the transmitted radar signal and each row of the matrix corresponding to a different sweep of the transmitted radar signal.

30. The method of claim 25 wherein the step of summing the modulated signals and down converting them down converts the modulated signals to base band.

31. The apparatus of claim 27 wherein the means for summing the modulated signals and down converting them down converts the modulated signals to base band.

32. The apparatus of claim 27 wherein the multiplication results or a summation of the multiplication results corresponding the acquisition of the field of view are organized into at least a two dimensional set or matrix of values with each column of the set or matrix corresponding to frequency steps of the transmitted radar signal and each row of the matrix corresponding to a different sweep of the transmitted radar signal.

33. The apparatus of claim 27 wherein said desired characteristics of the desired beam for each channel comprises a desired beam direction with desired beam side lobe characteristic or characteristics.

34. The apparatus of claim 27 wherein said transformational function comprises matched filter processing means or means approximating matched filter processing.

35. The apparatus of claim 34 wherein the means approximating matched filter processing comprises means performing a Fast Fourier Transform (FFT) function.

36. The apparatus of claim 35 wherein the FFT function is a 2D FFT function performed on the real and imaginary parts of the multiplication result for each of said channels.

37. The apparatus of claim 27 wherein a number of said binary phase shifters are utilized and a number of said channels are provided and further wherein the number of said channels is equal to the number of said binary phase shifters.

38. The apparatus of claim 27 further including means for generating and transmitting radar signals which reflect from said object(s) in said field of view, the radar signals being generated in sweeps to cover said field of view, and wherein the radar signals in each sweep are frequency modulated with Q frequency steps per sweep.

39. The apparatus of claim 38 wherein K sweeps of the transmitted radar signals are generated during an acquisition of said object(s) in said field of view.

40. The apparatus of claim 39 wherein the product of Q times K equals the number of range and velocity bins.

* * * * *